(12) United States Patent
Ishioka

(10) Patent No.: US 9,026,643 B2
(45) Date of Patent: May 5, 2015

(54) CONTENTS' RELATIONSHIP VISUALIZING APPARATUS, CONTENTS' RELATIONSHIP VISUALIZING METHOD AND ITS PROGRAM

(75) Inventor: Takuya Ishioka, Tokyo (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 12/899,036

(22) Filed: Oct. 6, 2010

(65) Prior Publication Data

US 2011/0087773 A1    Apr. 14, 2011

(30) Foreign Application Priority Data

Oct. 14, 2009  (JP) ................. 2009-237472

(51) Int. Cl.
*G06F 15/173* (2006.01)
*G06F 17/30* (2006.01)

(52) U.S. Cl.
CPC ................. *G06F 17/30572* (2013.01)

(58) Field of Classification Search
CPC ............. G06Q 30/063; G06Q 30/0255; G06F 17/30769; G06F 17/30867; H04L 67/306; H04N 21/25
USPC .................................. 709/224; 707/748–751
See application file for complete search history.

(56) References Cited

U.S. PATENT DOCUMENTS

| | | | | |
|---|---|---|---|---|
| 6,041,311 A * | 3/2000 | Chislenko et al. | ........... | 705/26.7 |
| 6,049,777 A * | 4/2000 | Sheena et al. | ................. | 705/7.32 |
| 6,438,579 B1 * | 8/2002 | Hosken | .......................... | 709/203 |
| 6,990,628 B1 * | 1/2006 | Palmer et al. | ................. | 715/234 |
| 7,877,387 B2 * | 1/2011 | Hangartner | ................... | 707/736 |
| 8,301,692 B1 * | 10/2012 | Hamaker et al. | ............. | 709/203 |
| 8,321,793 B1 * | 11/2012 | Cotter et al. | ................... | 715/745 |
| 8,340,011 B2 * | 12/2012 | Kenagy | ......................... | 370/312 |
| 2002/0178057 A1 * | 11/2002 | Bertram et al. | ................. | 705/14 |
| 2003/0110056 A1 * | 6/2003 | Berghofer et al. | ................ | 705/1 |
| 2007/0028266 A1 * | 2/2007 | Trajkovic et al. | ............... | 725/46 |
| 2007/0089057 A1 * | 4/2007 | Kindig | .......................... | 715/716 |
| 2007/0150515 A1 * | 6/2007 | Brave et al. | ............... | 707/104.1 |
| 2007/0203872 A1 * | 8/2007 | Flinn et al. | ...................... | 706/62 |

(Continued)

FOREIGN PATENT DOCUMENTS

| JP | 11-327994 A | 11/1999 |
|---|---|---|
| JP | 2000-029885 | 1/2000 |

(Continued)

OTHER PUBLICATIONS

Resnick, P. et al., "Recommender Systems", Commun. ACM vol. 40, Mar. 1997, pp. 56-58.

(Continued)

*Primary Examiner* — Duyen Doan
(74) *Attorney, Agent, or Firm* — Wolf, Greenfield & Sacks, P.C.

(57) ABSTRACT

There is provided a contents' relationship visualizing apparatus including a usage history acquiring unit for acquiring usage histories of multiple contents, a users' set specifying unit for specifying a content's users' set indicating users utilizing each content by use of the contents' usage histories, a similarity calculating unit for calculating a similarity between the specified users' sets by use of a similarity index, and a network creating unit for creating a network indicating a relationship between the contents by use of the calculated similarity between the users' sets.

13 Claims, 9 Drawing Sheets

(56) References Cited

U.S. PATENT DOCUMENTS

2008/0163118 A1* 7/2008 Wolf .............................. 715/835
2010/0153411 A1* 6/2010 Toebes et al. ................. 707/758
2010/0191680 A1* 7/2010 Lee et al. ......................... 706/12
2011/0125763 A1* 5/2011 Takanen et al. ............... 707/749

FOREIGN PATENT DOCUMENTS

| JP | 2002-342375 | 11/2002 |
| JP | 2003-099466 | 4/2003 |
| JP | 2004-348179 | 12/2004 |
| JP | 2005-309763 | 11/2005 |
| JP | 2006-164086 | 6/2006 |
| JP | 2006-343827 | 12/2006 |
| JP | 2007-164301 | 6/2007 |
| JP | 4124115 | 5/2008 |
| JP | 2009-080580 | 4/2009 |
| JP | 2009-199325 A | 9/2009 |

OTHER PUBLICATIONS

Fujimura, K. et al., "Topigraphy: Visualization for Large-scale Tag Clouds", WWW 2008, pp. 1087-1088, Apr. 2008.

Kagie, M. et al., "A Graphical Shopping Interface based on Product Attributes" Decision Support Systems, Economic Institute Report EI Feb. 2007, pp. 1-23.

Hayakawa et al., Similarity Retrieval between WWW Servers Based on Use History of User, Research Report of Information Processing Society, Corporate Juridical Person Information Processing Society, May 12, 1995, vol. 95, No. 40 (95-IM-21), pp. 11 to 17.

* cited by examiner

— LINK WITH SIMILARITY 1
— LINK WITH SIMILARITY 2

● GENRE a
● GENRE b
○ GENRE c

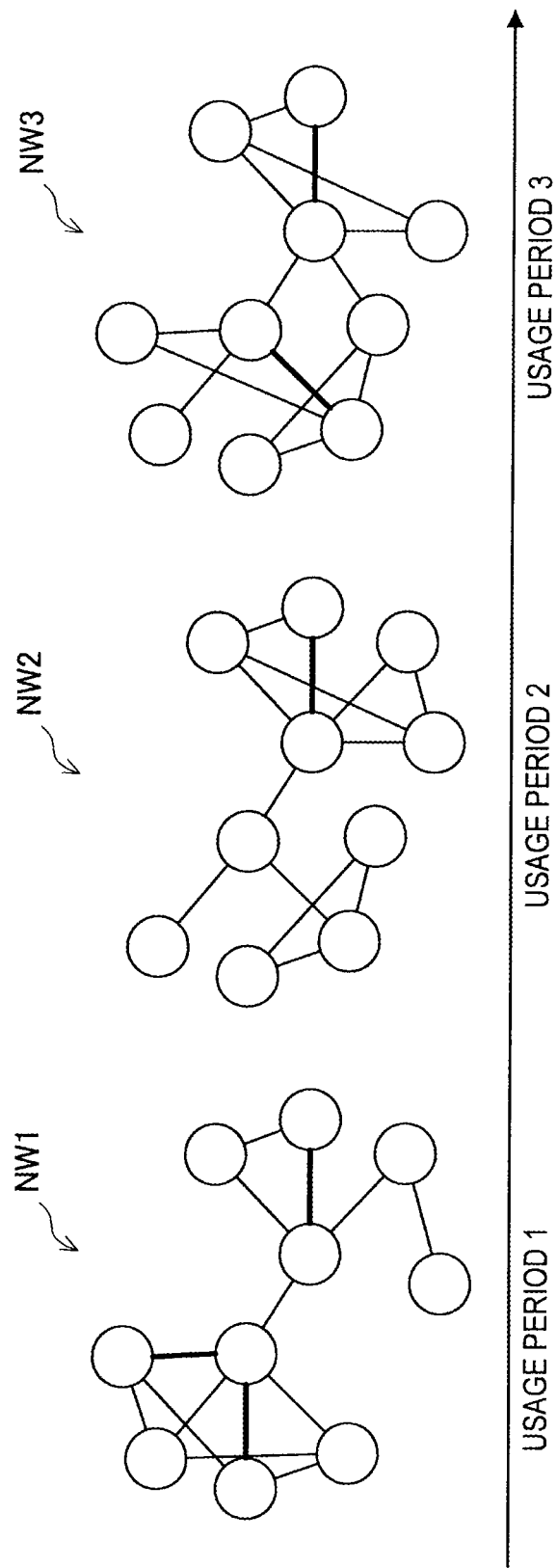

CONTENTS' RELATIONSHIP VISUALIZING APPARATUS, CONTENTS' RELATIONSHIP VISUALIZING METHOD AND ITS PROGRAM

BACKGROUND OF THE INVENTION

1. Field of the Invention

The present invention relates to a contents' relationship visualizing apparatus, a contents' relationship visualizing method and its program.

2. Description of the Related Art

Many contents are utilized in these days along with the development of information communicating techniques. On the other hand, there is a need to grasp a configuration of a contents' set made of many contents for improving retrievability of the contents. The configuration of the contents' set can be grasped by defining a relationship between the contents.

The method for defining a relationship between contents employs a method based on contents' attributes (such as genre, creator and creation timing) or a method based on contents' usage histories. However, since the method based on attributes needs to input attributes for each content, its usability may lower if the contents' set is on a large scale.

On the other hand, since the method based on usage histories has only to acquire usage histories, its usability rarely lowers in general even if the contents' set is on a large scale. The method based on usage histories can define a relationship between contents in consideration of contents' usage situations irrespective of existing attributes' classification.

For example, in Japanese Patent Application Laid-Open No. 2002-342375 described later, a relationship between contents is defined on the principle that "when the same user accesses multiple contents, the contents are in a certain relationship." The strength of the relationship between the two contents is defined by the number of users utilizing both the contents, that is, the co-occurrence frequency.

SUMMARY OF THE INVENTION

If a co-occurrence frequency is used, the strength of a relationship between contents may be considered relatively low unless there are many users for both the contents. However, even in this case, if most of users for one content also use the other content, the strength of the relationship between the contents may be considered relatively high. For example, if one wants to grasp the configuration of the contents' set including minor genres of contents, it is desirable to define the strength of the relationship between the contents irrespective of the absolute number of users utilizing each content.

In many cases like this case, it could be difficult to appropriately define the relationship between the contents using the co-occurrence frequency and thus the configuration of the contents' set cannot be accurately grasped.

It is thus desirable to provide a contents' relationship visualizing apparatus, a contents' relationship visualizing method and its program capable of visualizing a relationship between contents for accurately grasping a configuration of a contents' set.

According to the first embodiment of the present invention, there is provided a contents' relationship visualizing apparatus including a usage history acquiring unit for acquiring usage histories of multiple contents, a users' set specifying unit for, by use of the contents' usage histories, specifying a content's users' set indicating users utilizing each content, a similarity calculating unit for, by use of a similarity index, calculating a similarity between the specified users' sets, and a network creating unit for, by use of the calculated similarity between the users' sets, creating a network indicating a relationship between the contents.

With the configuration, a similarity index is used to calculate a similarity between users' sets, thereby creating a network indicating a contents' relationship. Thus, the contents' relationship can be more appropriately defined irrespective of the absolute number of users utilizing each content than when a co-occurrence frequency is used. A user can accurately grasp the configuration of the contents' set using the network indicating the contents' relationship.

The contents' relationship visualizing apparatus may further include a partial network extracting unit for extracting a partial network meeting a predetermined reference from the created network. The partial network extracting unit may extract a partial network made of contents whose similarity between users' sets meets a predetermined reference from the created network, a partial network made of contents belonging to a cluster meeting a predetermined reference from the created network, or a partial network made of contents having a characteristic meeting a predetermined reference from the created network.

The contents' relationship visualizing apparatus may further include a content aggregating unit for aggregating multiple contents meeting a predetermined reference into one content and aggregating usage histories of the multiple contents into one usage history.

The usage history acquiring unit may acquire usage histories of multiple contents having attributes corresponding to the selected contents' set depending on a contents' set selecting result.

The network creating unit may create a network indicating a content by a node and indicating a contents' relationship by a link connecting the nodes.

The usage history acquiring unit may acquire usage histories of multiple contents in each of at least two mutually-different periods, and the network creating unit may create a network indicating a contents' relationship in each of the at least two periods.

The similarity calculating unit may use any one similarity index among Jaccard coefficient, Simpson's coefficient, cosine similarity, Pearson's product-moment correlation coefficient, Euclidean distance, Mahalanobis' distance and kernel function to calculate a similarity between the specified users' sets.

According to the second embodiment of the present invention, there is provided a contents' relationship visualizing method to be performed by a contents' relationship visualizing apparatus, comprising acquiring usage histories of multiple contents, specifying a content's users' set indicating users utilizing each content by use of the contents' usage histories, calculating a similarity between the specified users' sets by use of a similarity index, and creating a network indicating a relationship between the contents by use of the calculated similarity between the users' sets.

According to the third embodiment of the present invention, there is provided a program to a computer to execute the above-mentioned contents' relationship visualizing method. Here the program may be provided using a computer readable recording medium, or may be provided via a communication method.

As described above, the present invention can provide a contents' relationship visualizing apparatus, a contents' relationship visualizing method and its program capable of visualizing a relationship between contents for accurately grasping a configuration of a contents' set.

BRIEF DESCRIPTION OF THE DRAWINGS

FIG. 8 is a diagram showing one example of time-line network display; and

DETAILED DESCRIPTION OF THE EMBODIMENT

Figure 1:
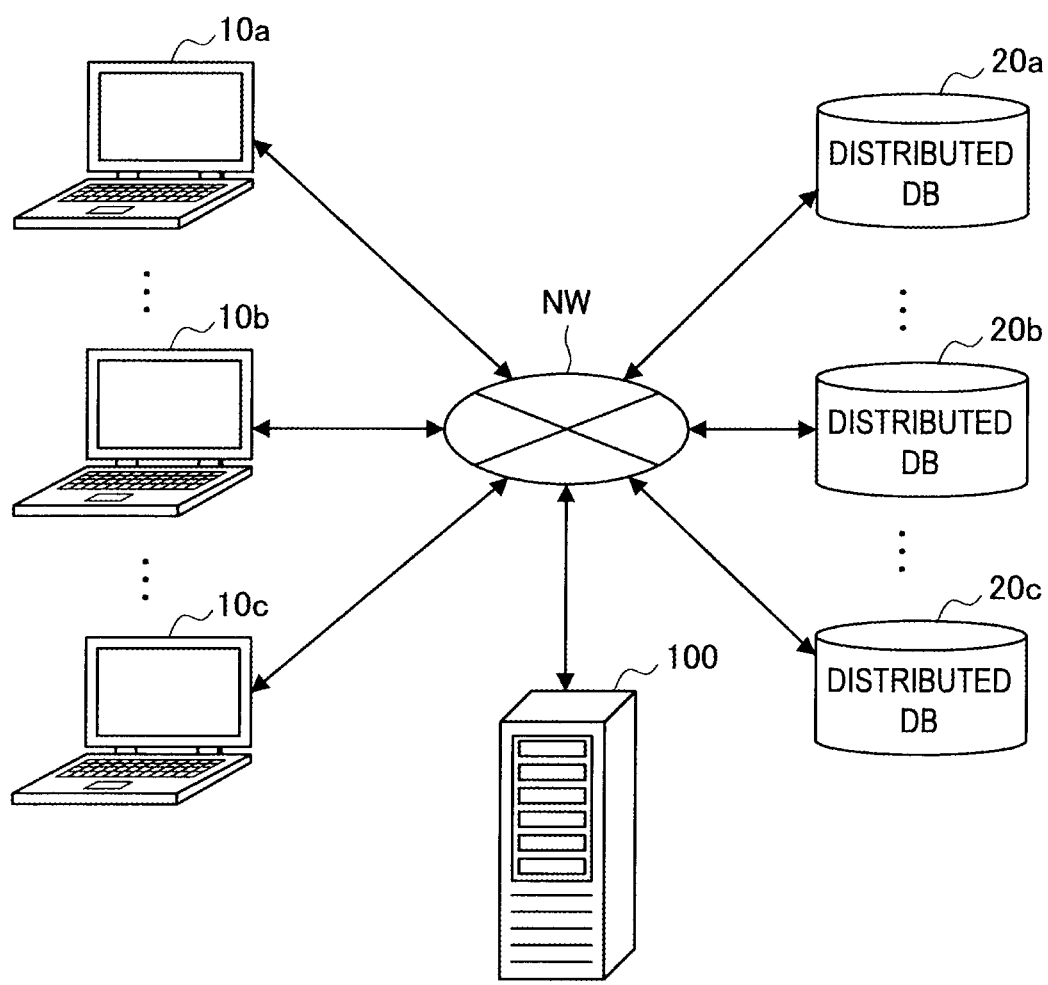
FIG. 1 is a diagram showing a system including a server (contents' relationship visualizing apparatus) according to one embodiment of the present invention.

A preferred embodiment of the present invention will be described below in detail with reference to the appended drawings. Note that, in this specification and the appended drawings, structural elements that have substantially the same function and structure are denoted with the same reference numerals, and repeated explanation of these structural elements is omitted.

[1. System Configuration]

FIG. 1 is a diagram showing a system including a server 100 (contents' relationship visualizing apparatus) according to one embodiment of the present invention. As shown in FIG. 1, the system includes a plurality of user terminals 10, a plurality of distributed databases 20 (which will be referred to as distributed DB 20 below) and the server 100, which are interconnected via a network N. FIG. 1 shows user terminals 10a to 10c as user terminal 10 and distributed DBs 20a to 20c as distributed DB 20 by way of example.

The user terminal 10 is an information processing apparatus having a communication function and a display function such as personal computer, PDA or cell phone. The distributed DB 20 is a database apparatus for managing contents and contents' usage. The server 100 is a server apparatus having a communication function.

A user uses the user terminal 10 to utilize the contents managed by the distributed DBs 20. The server 100, on a user's request, uses the usage histories of the contents to create a network indicating a relationship between the contents and to present it to the user.

Specifically, the server 100 acquires the usage history of a content from the distributed DB 20 in response to a user's request. Next, the server 100 uses the acquired usage history to specify a users' set S of the content which indicates the users utilizing each content. Then the server 100 uses a similarity index to calculate a similarity between the specified users' sets S. The server 100 creates a network indicating the relationship between the contents and presents it to the user.

The server 100 uses the similarity index to calculate a similarity between the users' sets S and creates a network indicating the relationship between the contents. The relationship between the contents can be more appropriately defined irrespective of the absolute number of users utilizing each content than when a co-occurrence frequency is used. The user can accurately grasp the configuration of the contents' set using the network indicating the contents' relationship.

[2. Configuration of Server 100]

Figure 2:
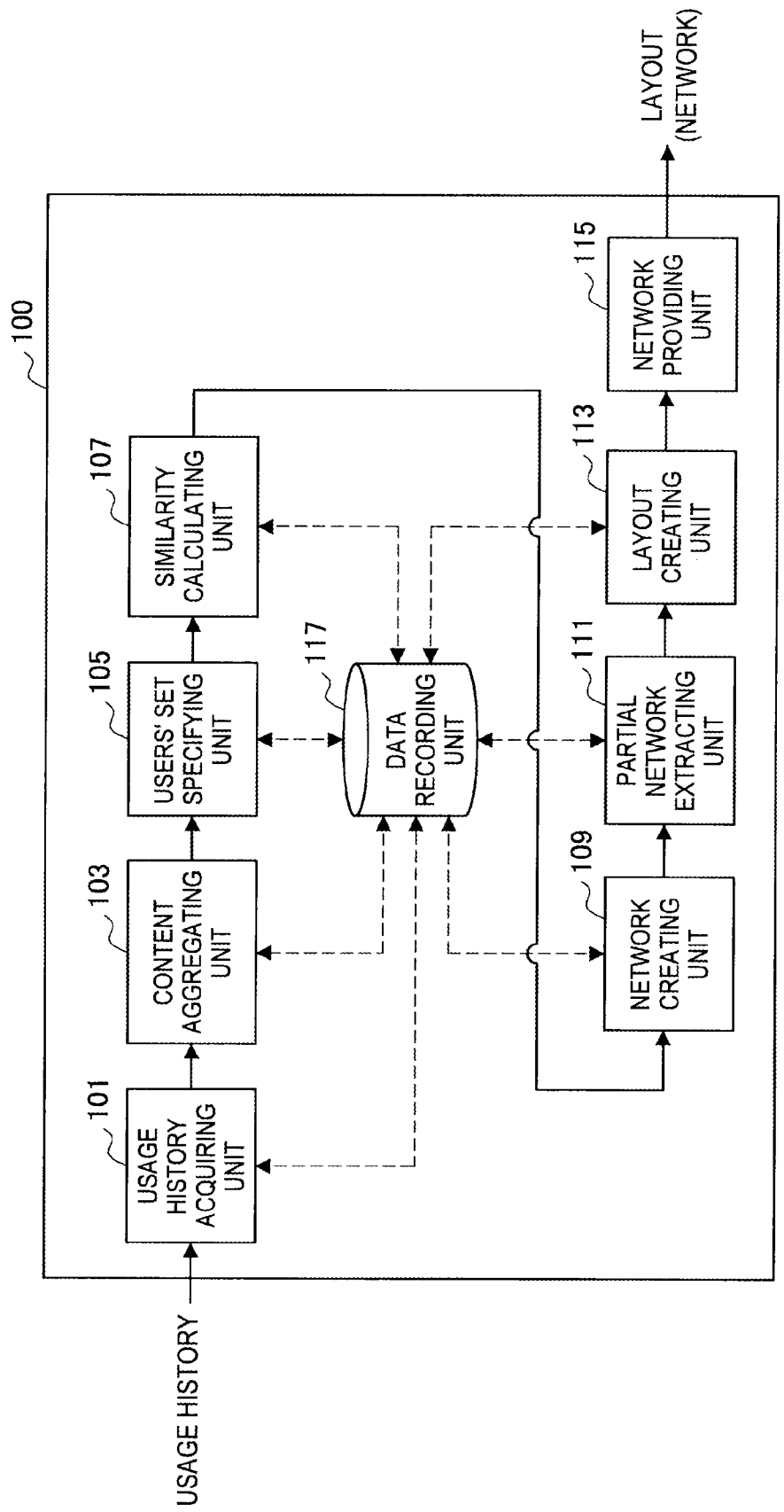
FIG. 2 is a diagram showing a main functional configuration of the server.

FIG. 2 is a diagram showing a main functional configuration of the server 100 (contents' relationship visualizing apparatus). As shown in FIG. 2, the server 100 includes a usage history acquiring unit 101, a content aggregating unit 103, a users' set specifying unit 105, a similarity calculating unit 107, a network creating unit 109, a partial network extracting unit 111, a layout creating unit 113, a network providing unit 115 and a data recording unit 117.

The usage history acquiring unit 101 acquires the usage histories of multiple contents from the distributed DBs 20. The usage history is composed of user ID, user-utilized content ID, usage time and others. The usage history is managed by at least one distributed DB 20 and is updated on the content's usage. The content's usage means viewing, purchasing, reserving or inquiring a content.

The content aggregating unit 103 aggregates multiple contents meeting a predetermined reference into one content, and additionally aggregates usage histories of the contents into one usage history. This is because it may be desirable to handle the contents constituting a series or the pre- or post-updated contents as the same content, respectively, for accurately grasping the configuration of the contents' set.

If a content is for programs, the predetermined reference is attribute information contained in program information such as program name, series name, genre, cast, broadcasting station and broadcasting time. The aggregated content and usage history are defined by assigning a new ID. The content's attribute information is held in the distributed DB 20 or the server 100 together with the content ID, and is referred to via the content ID as needed.

The users' set specifying unit 105 uses a content's usage history to specify a users' set S of the content which indicates the users utilizing each content. The users' set S is specified as a users' set Sa, Sb, . . . , which indicates the users utilizing a content ca, cb, . . . , by using the user ID and the content ID contained in the usage history.

The similarity calculating unit 107 uses a similarity index other than co-occurrence frequency to calculate a similarity between the specified users' sets S. The similarity index is an index indicating a degree of coincidence of elements between two sets. The co-occurrence frequency is the number of common elements contained in both a set X and a set Y, and is defined as $|X \cap Y|$. For example, when the users ua and ub are contained in both the users' set Sa for the content ca and the users' set Sb for the content cb, the co-occurrence frequency between the users' sets Sa and Sb is calculated as 2.

The similarity index other than the co-occurrence frequency includes Jaccard coefficient, Simpson's coefficient and cosine similarity, for example. The similarity index may include Pearson's product-moment correlation coefficient, Euclidean distance, Mahalanobis' distance and kernel function.

The Jaccard coefficient is a value obtained by dividing the number of common elements between the set X and the set Y by the total number of elements contained in at least one set, and is defined as $|X \cap Y|/|X \cup Y|$. The Simpson's coefficient is a value obtained by dividing the number of common elements between the set X and the set Y by the minimum number of elements contained in each set, and is defined as |X∩Y|/min (|X|, |Y|). The cosine similarity is a value obtained by dividing the number of common elements between the set X and the set Y by the distance between the sets X and Y, and is defined as |X∩Y|/sqrt(|X|, |Y|).

For example, the similarity between the set X {1,1,0,1} and the set Y {1,0,0,1} is indicated by the co-occurrence frequency of 2, the Jaccard coefficient of 0.67, the Simpson's coefficient of 1.00 and the cosine similarity of 0.82. The similarity between the set X {1,1,0,0} and the set Y {1,1,0,0} is indicated by the co-occurrence frequency of 2, the Jaccard coefficient of 1.00, the Simpson's coefficient of 1.00, and the cosine similarity of 1.00.

The network creating unit 109 uses the calculated similarity between the users' sets S to create a network indicating the relationship between the contents. In the network, a content is represented by a node and a contents' relationship is represented by a link connecting the nodes.

The partial network extracting unit 111 extracts a partial network meeting a predetermined reference from the created network. This is because it may be desirable to classify or discriminate the contents contained in the contents' set in a specific viewpoint for accurately grasping the configuration of the contents' set. This is because since the network configuration is complicated if the contents' set is on a large scale, the configuration of the contents' set may not be accurately grasped.

There is extracted, as the partial network, a part made of the contents whose similarity between the users' sets S meets a predetermined reference, a part made of the contents belonging to a cluster meeting a predetermined reference, or a part made of the contents having a characteristic meeting a predetermined reference. The clustering may be performed by the partial network extracting unit 111 or by a clustering processor (not shown). The content's characteristics are held in the distributed DB 20 or the server 100 as the content's attribute information together with the content ID.

The layout creating unit 113 creates a layout for drawing a network (including partial network) or a time-line network described later. The layout is information for specifying a drawing condition of the node and link indicating the network. The layout creating unit 113 may be configured with an existing network drawing tool.

The layout is created according to a predetermined model such as spring model, Kamada-Kawai model or Fruchterman-Reingold model. With the layout, the content's attributes (genre and magnitude of users' set S) are represented by shape, size, color and others of the node. The relationship between the contents (such as relationship strength or new/old relationship) is represented by line type and width of the link or arrow's direction.

The network providing unit 115 provides a created layout to the user (user terminal 10). The data recording unit 117 temporarily records therein data on usage history, users' set S, similarity between users' sets S and network.

[3. Operation of Server 100]

Figure 3:
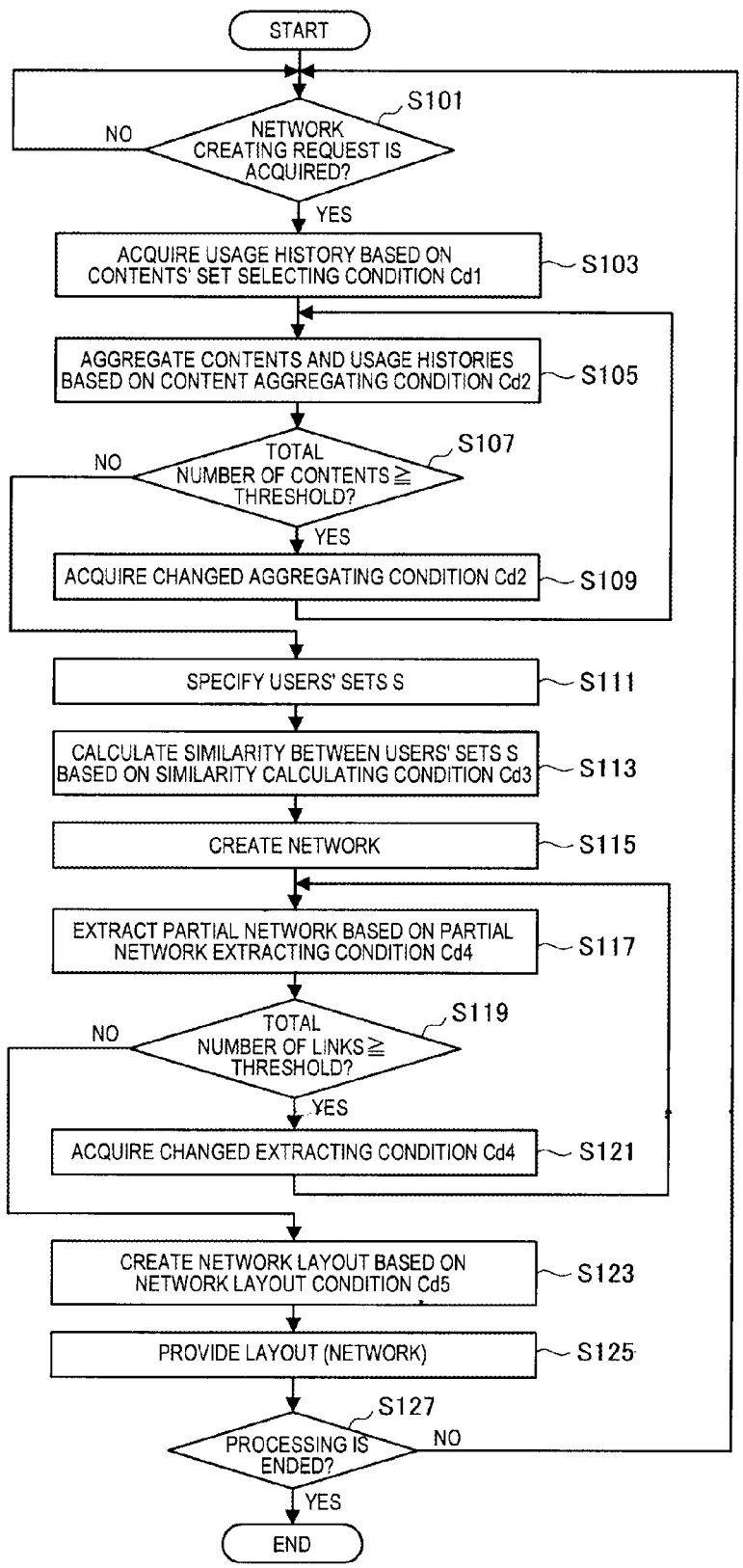
FIG. 3 is a flowchart showing an operation of the server.
Figure 4:
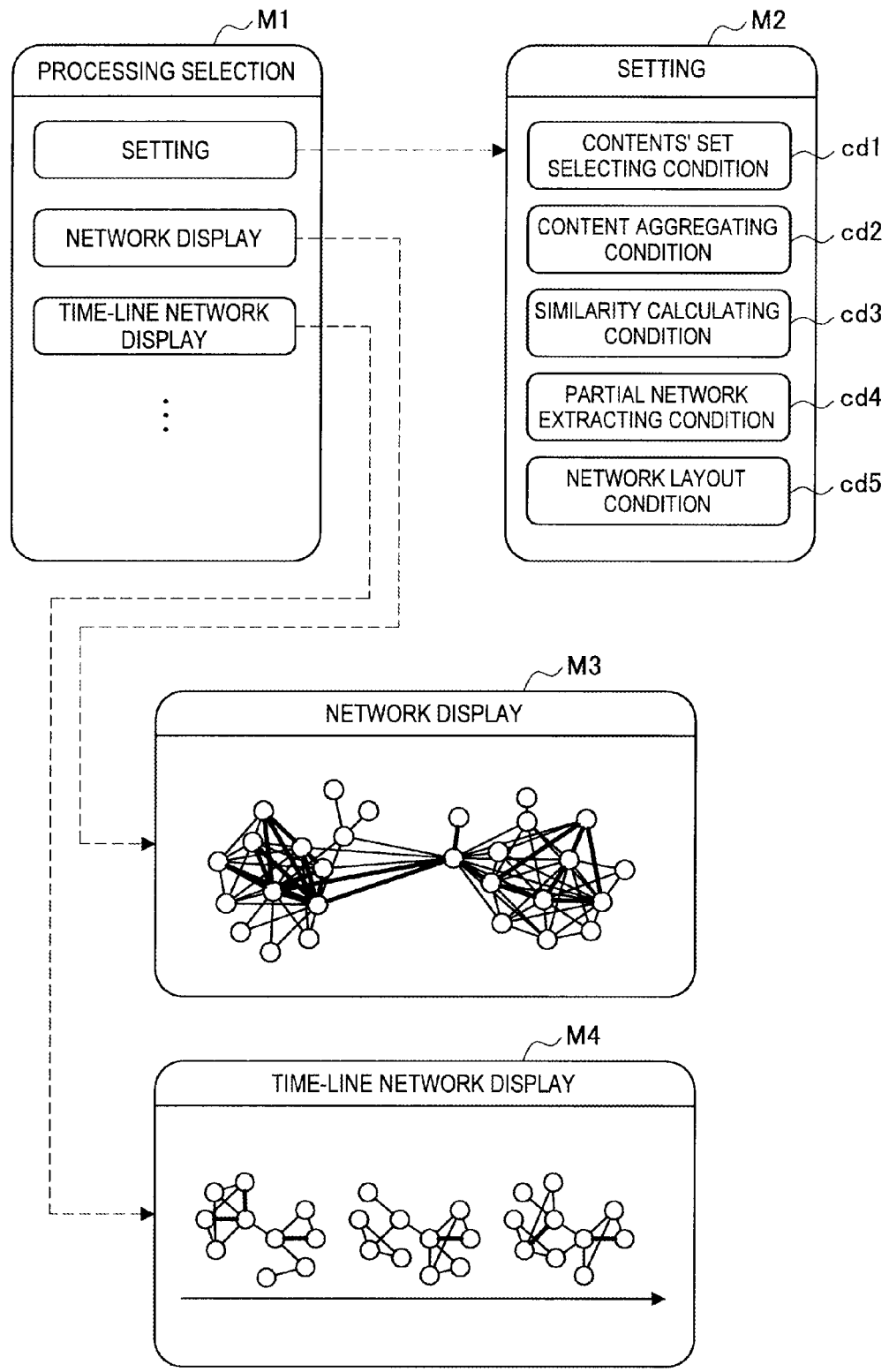
FIG. 4 is a diagram showing a configuration example of GUI displayed on a user terminal.
Figure 5:
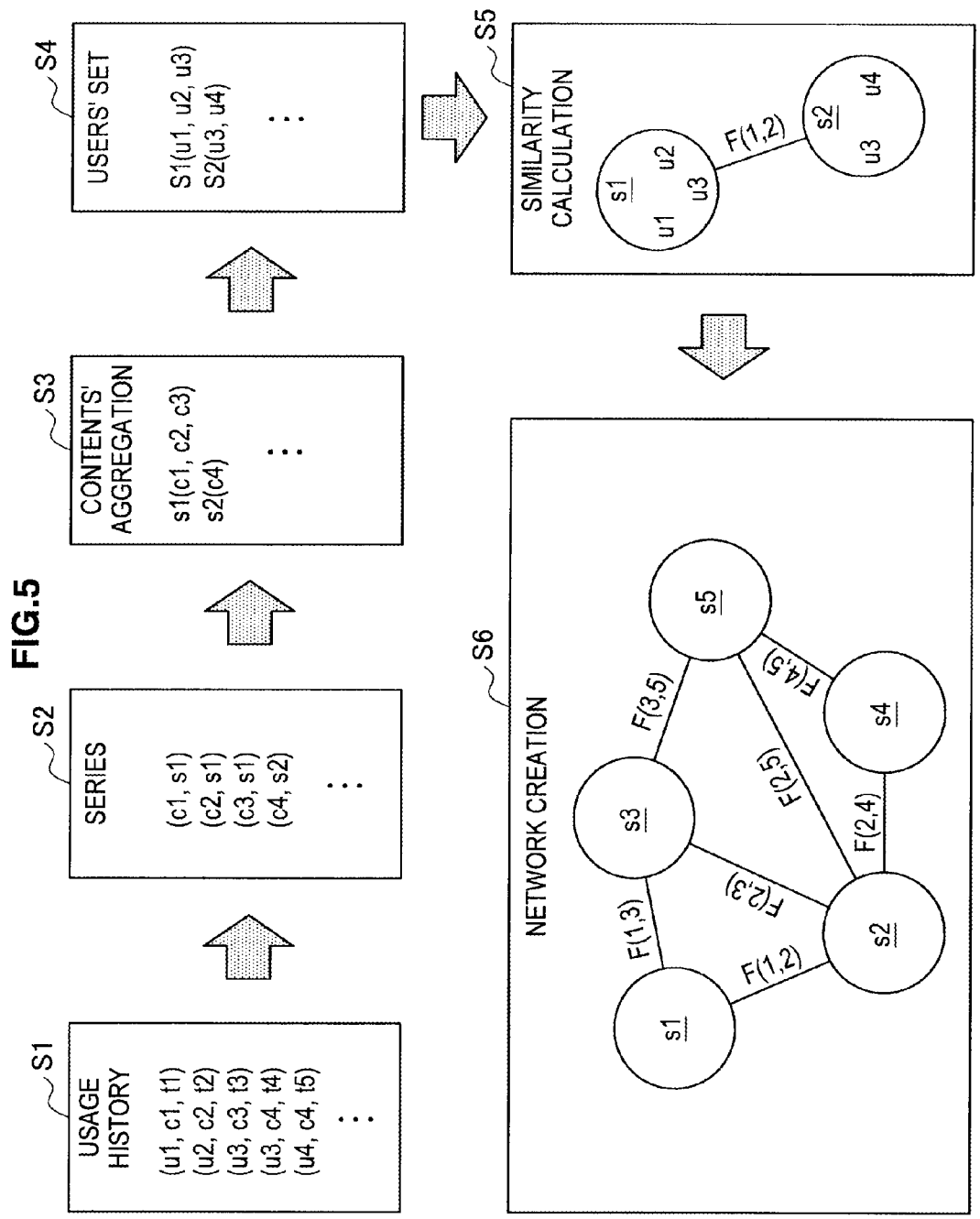
FIG. 5 is a diagram schematically showing a creation example of a network.
Figure 6:
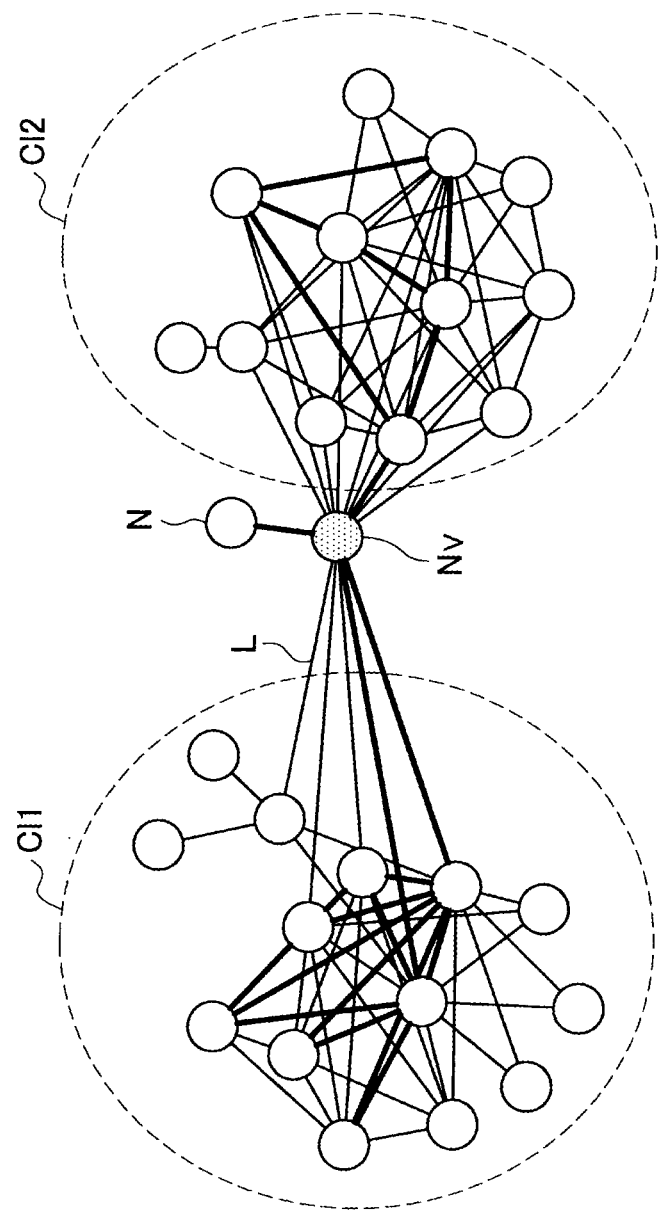
FIG. 6 is a diagram showing one example of network display.

An operation of the server 100 (contents' relationship visualizing apparatus) will be described below with reference to FIGS. 3 to 9. FIG. 3 is a flowchart showing the operation of the server 100. FIG. 4 is a diagram showing a configuration example of GUI (Graphical User Interface) displayed on the user terminal 10. FIG. 5 is a diagram schematically showing a network creating procedure. FIG. 6 is a diagram showing one example of network display. FIG. 7 is a diagram showing one example of partial network display. FIG. 8 is a diagram showing one example of time-line network display.

As shown in FIG. 3, the server 100 acquires a network creating condition and a network creating request together from the user via the user terminal 10. The network creating condition is set by the user on a setting screen displayed on the user terminal 10.

The GUI shown in FIG. 4 is formed of a setting screen M2, a network display screen M3 and a time-line network display screen M4 with a processing selection screen M1 as starting point.

There are set, on the setting screen M2, a contents' set selecting condition Cd1, a content aggregating condition Cd2, a similarity calculating condition Cd3, a partial network extracting condition Cd4 and a network layout condition Cd5. A network (including partial network) and a time-line network are displayed in the network display screen M3 and the time-line network display screen M4, respectively.

The contents' set selecting condition d1 is for selecting a contents' set whose network is to be created. If the content is for programs, the contents' set is selected or designated on the basis of attribute information such as series name, genre, cast, broadcasting station and broadcasting time. The user can thus retrieve a desired content by selecting the contents' set unless he/she can previously specify the desired content.

When the time-line network is created, at least two different periods are designated for selecting a contents' set for which each network constituting the time-line network is to be created.

The content aggregating condition Cd2 is the predetermined reference used for aggregating contents, and the similarity calculating condition Cd3 is the similarity index used for calculating a similarity. The partial network extracting condition Cd4 is the predetermined reference used for extracting a partial network, and the network layout condition Cd5 is the predetermined drawing condition for model, node and link used for drawing a network.

The user sets the network creating condition on the setting screen M2 to request the server 100 to create the network via the user terminal 10. When acquiring the creating request, the server 100 starts the network creating processing according to the network creating condition (step S101).

The usage history acquiring unit 101 acquires a usage history of a content meeting the contents' set selecting condition from at least one distributed DB 20 (S103). When a network is created, the ID of the content whose usage history is to be acquired is specified under the selecting condition Cd1 and the usage history containing the ID of the specified content is acquired. When a time-line network is created, the time of the content whose usage history is to be acquired is specified under the selecting condition Cd1 and the usage history containing the time of the specified content is acquired. The data recording unit 117 temporarily records therein the data on the acquired usage history.

The content aggregating unit 103 aggregates multiple contents meeting a predetermined reference into one content and additionally aggregates usage histories of the multiple contents into one usage history (S105). The contents are aggregated so that the total number of contents contained in the contents' set is reduced. The data recording unit 117 temporarily records therein the data on the aggregated usage history.

The content aggregating unit 103 determines whether the total number of contents contained in the contents' set is equal to or more than a predetermined threshold (S107). The threshold is previously set, by using the drawn network, as a value within the range in which the user can accurately grasp the relationship between the contents.

When the determining condition is met, the server 100 notifies the user terminal 10 that the total number of contents is not proper. When receiving the notification, the user terminal 10 promotes the user to change the content aggregating condition Cd2 on the setting screen M2. The server 100 acquires the changed aggregating condition Cd2 (S109) and aggregates the contents again (S105). On the other hand, when the determining condition is not met, the server 100 performs the subsequent step S111.

If the content aggregating condition Cd2 is not set, the processing in step S105 can be omitted. If the total number of contents does not meet the determining condition, the contents are aggregated in the above manner in the processing in step S105 through the processing in step S109.

The users' set specifying unit 105 uses the content's usage history to specify the users' set S of each content contained in the contents' set (S111). The users' set S for the aggregated contents is specified by using the aggregated usage histories. The data recording unit 117 temporarily records therein the data on the specified users' set S.

The similarity calculating unit 107 calculates a similarity between the specified users' sets S according to the similarity calculating condition Cd3 (S113). The similarity between the users' sets S is calculated using the similarity index other than the co-occurrence frequency. The data recording unit 117 temporarily records therein the data on the calculated similarity.

The network creating unit 109 uses the calculated similarity between the users' sets S to create a network indicating the relationship between the contents (S115). The data recording unit 117 temporarily records therein the data on the created network.

The partial network extracting unit 111 extracts a partial network meeting the partial network extracting condition Cd4 from the created network (S117). The data recording unit 117 temporarily records therein the data on the extracted partial network.

When extracting the partial network, the partial network extracting unit 111 determines whether the total number of links contained in the partial network is equal to or more than a predetermined threshold (S119). The threshold is previously set, by using the drawn network, as a value within the range in which the user can accurately grasp the configuration of the contents' set.

When the determining condition is met, the server 100 notifies the user terminal 10 that the total number of links is not proper. When receiving the notification, the user terminal 10 promotes the user to change the partial network extracting condition Cd4 on the setting screen M2. The server 100 acquires the changed extracting condition Cd4 (S121) and extracts a partial network again (S117). On the other hand, when the determining condition is not met, the server 100 performs the subsequent step S123.

If the partial network extracting condition Cd4 is not set, the processing in step S117 can be omitted. When the total number of links does not meet the determining condition, the partial network is extracted in the above manner in the processing in step S117 through the processing in step S121.

The layout creating unit 113 creates a network layout according to the network layout condition Cd5 from the network (including partial network) or the time-line network (S123). The network providing unit 115 transmits the created layout to the user terminal 10. When a time-line network is created, it is desirable that the layout for all the networks constituting the time-line network is created and then transmitted to the user terminal 10.

When receiving the layout, the user terminal 10 uses the layout to display the network (including partial network) or the time-line network. When the user requests to continue the processing after the network display, the user terminal 10 displays the setting screen M2. The server 100 terminates the processing when the user requests to terminate the processing (S127). On the other hand, when the network creating condition is changed on the setting screen M2, the server 100 acquires the changed creating condition and the network creating request together from the user (S101).

There has been described above the case where the data recording unit 117 temporarily records therein the processing results by the usage history acquiring unit 101, the content aggregating unit 103, the users' set specifying unit 105, the similarity calculating unit 107, the network creating unit 109 and the partial network extracting unit 111. However, the processing results by at least part of them may be directly used for the subsequent processings instead of being temporarily recorded in the data recording unit 117.

FIG. 5 schematically shows a network creating example. The server 100 acquires the combinations of user ID, content ID and usage time such as (u1, c1, t1), (u2, c2, t2), (u3, c3, t3), (u3, c4, t4) and (u4, c4, t5), . . . , as the usage history data from the distributed DB 20 (step S1).

The server 100 acquires the combinations of content ID and series ID such as (c1, s1), (c2, s1), (c3, s1) and (c4, s2), . . . , as the series data from the distributed DB 20 (step S2). The server 100 may previously hold the series data. Though not shown in FIG. 5, the server 100 may acquire or hold the combination of series ID and series name as series name data.

The server 100 aggregates the contents c1, c2 and c3 into the series s1 and aggregates the content c4 into the series s2 (step S3). Since the series s2 is made of one content c4, the content c4 may not be aggregated into the series s2 and handled as c4.

The server 100 specifies the users' set S1 for the series s1 as S1(u1, u2, u3) and specifies the users' set S2 for the series s2 as S2(u3, u4) (step S4). Similarly, the server 100 specifies the users' sets S3 to S5 for the series s3 to s5.

When the users' sets S1 to S5 are specified, the server 100 uses the similarity index other than the co-occurrence frequency to calculate a similarity between the users' sets S1 to S5 (step S5). When two series are similar to each other, the server 100 creates the combinations of the series ID and the similarity between both the two series as series relationship data. When the two series are assumed as X and Y, respectively, for example, the series relationship data is represented by the matrix F(X, Y) and the value of the matrix F indicates the similarity between the series sx and sy.

The server 100 uses the series relationship data to create a network indicating the relationship between the series s1 to s5 (step S6). For the network, the series s1 to s5 are represented by the nodes and the similarity between the users' sets S1 to S5 is represented by the value F(X, Y) on the link connecting the nodes.

There will be described below one example in which different indexes are used to calculate the similarity between the users' sets S. It is assumed that the similarities between the users' sets Sa and Sb for the series sa and sb and between the users' sets Sa and Sc for the series sa and sc are calculated.

As indicated in the following table, the numbers of users contained in the users' sets Sa, Sb and Sc are 100, 100, 5, respectively. |Sa∪Sb|=180 and |Sa∪Sc|=100 are obtained, and the co-occurrence frequencies of |Sa∩Sb|=20 and |Sa∩Sc|=5 are obtained. Here, all the users contained in the users' set Sc are contained in the users' set Sa and consequently all the users in the series sc utilize the series sa.

TABLE 1

表1

|  | \|X\| | \|Y\| | \|X∪Y\| | Co-occurrence frequency \|X∩Y\| | Jaccard coefficient | Simpson's coefficient | Cosine similarity |
|---|---|---|---|---|---|---|---|
| Sa-Sb | 100 | 100 | 180 | 20 | 0.11 | 0.20 | 0.20 |
| Sa-Sc | 100 | 5 | 100 | 5 | 0.05 | 1.00 | 0.22 |
| Ratio |  |  |  | 0.25 | 0.45 | 5.00 | 1.12 |

When the co-occurrence frequency is used as the similarity index, the similarities between the users' sets Sa and Sb and between the users' sets Sa and Sc are calculated as 20 and 5, respectively. The strength of the relationship between the series s1 and s3 is 0.25 times as high as the strength of the relationship between the series s1 and s2. In other words, when the co-occurrence frequency is used, the absolute number of users contained in the users' set Sc is small and thus the strength of the relationship between the series sa and sc may be considered relatively low.

On the other hand, when the Jaccard coefficient is used, for example, the similarities between the users' sets Sa and Sb and between the users' sets Sa and Sc are calculated as 0.11 and 0.05, respectively. The strength of the relationship between the series s1 and s3 is considered 0.45 times as high as the strength of the relationship between the series s1 and s2.

When the Simpson's coefficient is used, for example, the similarities between the users' sets Sa and Sb and between the users' sets Sa and Sc are calculated as 0.20 and 1.00, respectively. Therefore, the strength of the relationship between the series s1 and s3 is considered five times as high as the strength of the relationship between the series s1 and s2.

When the cosine similarity is used, for example, the similarities between the users' sets Sa and Sb and between the users' sets Sa and Sc are calculated as 0.20 and 0.22, respectively. Thus, the strength of the relationship between the series s1 and s3 is considered as 1.12 times as high as the strength of the relationship between the series s1 and s2.

As described above, when the similarity index other than the co-occurrence frequency is used, the strength of the relationship between the series sa and sc can be considered relatively high irrespective of the absolute number of users contained in the users' set Sc than when the co-occurrence frequency is used. The similarity index can be appropriately selected depending on the characteristics of the contents' relationship to be visualized.

FIG. 6 shows one example of network display. In the example shown in FIG. 6, a node N over the network indicates a content and a link L indicates a relationship between contents. The width of the link L indicates the strength of the relationship between the contents. In this example, a specific content connecting the contents' clusters Cl1 and Cl2 is indicated as node Nv. The content is noted by the users of the contents contained in both the clusters Cl1 and Cl2 and the users of the contents contained in both the clusters Cl1 and Cl2 may be emphasized for communication.

Figure 7A:
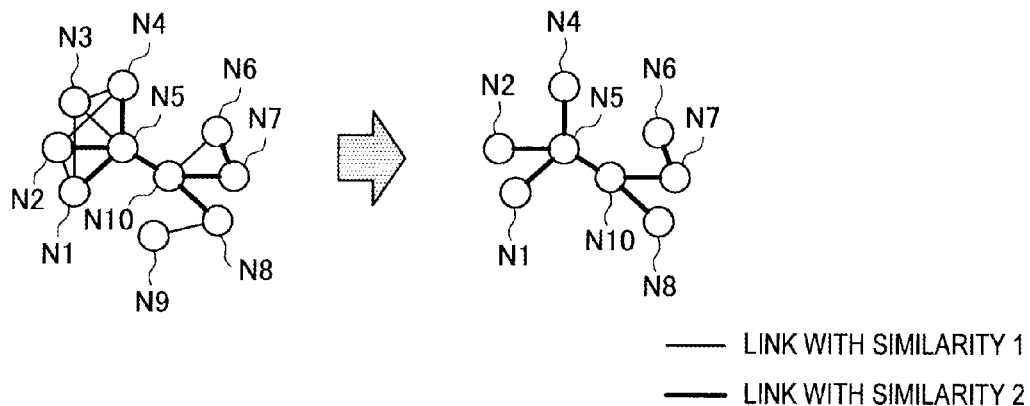
FIG. 7A is a diagram (1/3) showing one example of partial network display.
Figure 7B:
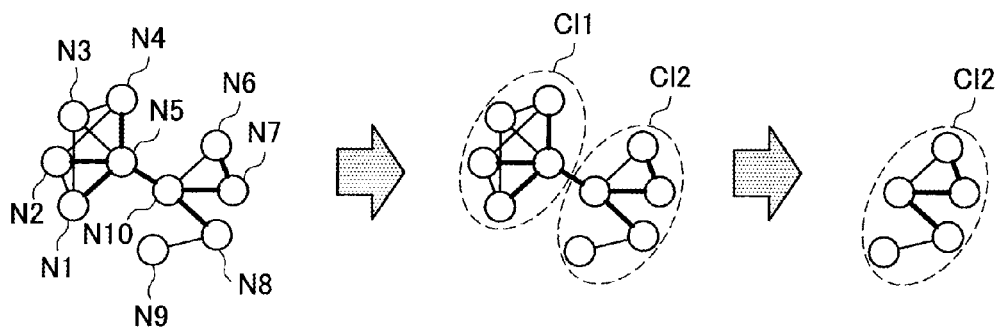
FIG. 7B is a diagram (2/3) showing one example of partial network display.
Figure 7C:
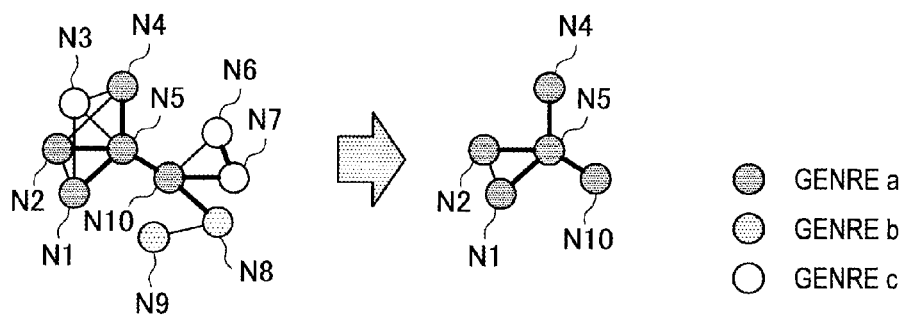
FIG. 7C is a diagram (3/3) showing one example of partial network display.

FIGS. 7A to 7C show one example of partial network display. A partial network is extracted from the network indicating the configuration of the contents' set as user's viewpoint.

In the example shown in FIG. 7A, a part made of the contents whose similarity between the users' sets S meets a predetermined reference is extracted. The network is composed of the nodes N1 to N10 interconnected via the link L having the similarity 1 or 2. There is extracted a partial network made of the nodes N1, N2, N4 to N8 and N10 which are interconnected via the link L having the similarity 2 with reference to at least similarity 2. Thus, the user can accurately grasp the configuration of the contents' set in consideration of the strength of the relationship between the contents.

In the example shown in FIG. 7B, a part made of the contents belonging to a cluster meeting a predetermined reference is extracted. Based on the clustering result using the similarity between the nodes, the nodes N1 to N10 are clustered into the clusters Cl1 and Cl2 and a partial network made of the nodes N6 to N10 contained in the cluster Cl2 is extracted. The user can accurately grasp the configuration of the contents' set in consideration of the cluster constituting the contents' set.

In the example shown in FIG. 7C, a part made of the contents having a characteristic meeting a predetermined reference is extracted. The network is made of the nodes N1 to N10 belonging to the genres a, b and c. A partial network made of the nodes N1, N2, N4, N5 and N10 belonging to the genre a is extracted with reference to the genre a. Thus the user can accurately grasp the configuration of the contents' set in consideration of the characteristic of the contents.

FIG. 8 shows one example of time-line network display. The time-line network is configured of at least two networks indicating the relationship between the contents utilized in at least two different periods. Each network constituting the time-line network is created using the usage history (user ID, content ID and usage time).

In the example shown in FIG. 8, the networks NW1, NW2 and NW3 corresponding to the usage periods 1, 2, 3, respectively, are displayed in time-line. Thus, the user can use the networks corresponding to at least two different usage periods to accurately grasp a time-line change in the configuration of the contents' set.

A content and/or a contents' relationship may be display in detail as detailed information on the designated nodes and links on the network display screen M3 and the time-line network display screen M4 depending on the designation of a specific node or link. A content and/or a contents' relationship may be enlarged as the detailed information on the designated nodes and the link connecting the nodes on each display screen M3 or M4 depending on the designation of at least one node.

[4. Hardware Configuration of Server 100]

Figure 9:
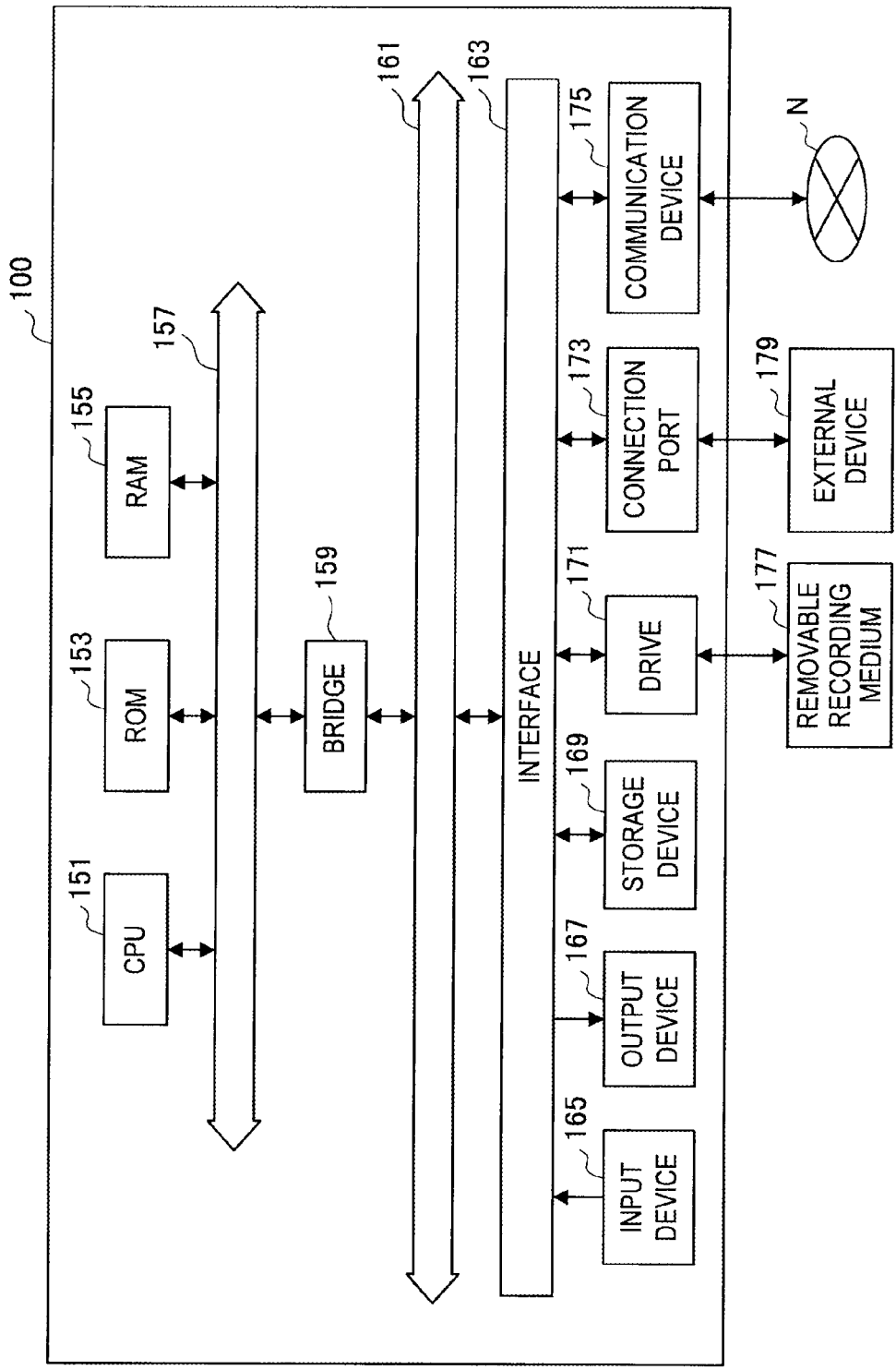
FIG. 9 is a diagram showing a hardware configuration example of the server.

FIG. 9 is a block diagram showing a hardware configuration example of the server 100 (content' relationship visualizing apparatus). The server 100 mainly includes a CPU 151, a ROM 153, a RAM 155, a host bus 157, a bridge 159, an external bus 161, an interface 163, an input device 165, an output device 167, a storage device 169, a drive 171, a connection port 173 and a communication device 175.

The CPU 151 functions as a computing processor and a control device, and at least partially controls the operation of the server 100 according to various programs recorded in the ROM 153, the RAM 155, the storage device 169 or a removable recording medium 177.

The ROM 153 stores therein programs or parameters to be used by the CPU 151. The RAM 155 temporarily stores therein programs to be executed by the CPU 151 and parameters for program execution. The programs function as the usage history acquiring unit 101, the users' set specifying unit 105, the similarity calculating unit 107, the network creating unit 109 and others.

The CPU 151, the ROM 153 and the RAM 155 are interconnected via the host bus 157. The host bus 157 is connected to the external bus 161 via the bridge 159.

The input device 165 is an operating means operable by the user of the server 100 such as mouse, keyboard, touch panel, button or switch. The input device 165 includes an input controlling circuit for generating an input signal based on user-input operation information using the operating means, for example, and outputting it to the CPU 151. The user inputs various items of data and instructs processing operations for the server 100 via the operation of the input device 165.

The output device 167 is a display means such as liquid crystal display. The output device 167 outputs a processing result of the server 100.

The storage device 169 is a data storage device and includes a magnetic storage device such as HDD. The storage device 169 stores therein programs to be executed by the CPU 151, various items of data and other various items of data acquired from the outside.

The drive 171 is a reader/writer for recording medium and is incorporated in or externally attached to the server 100. The drive 171 reads out the recorded data from the removable recording medium 177 such as mounted magnetic disk to output it to the RAM 155, and writes the to-be-recorded data therein.

The connection port 173 is for directly connecting an external device 179 such as USB port to the server 100. The server 100 acquires the data from the external device 179 connected to the connection port 173 via the connection port 173, and provides the data thereto.

The communication device 175 is a communication interface configured of a communication device for connecting to the network N. The communication device 175 is a communication card for wired or wireless LAN, for example.

[5. Conclusion]

The contents' relationship visualizing apparatus according to the embodiment uses a similarity index to calculate a similarity between users' sets S and to create a network indicating a contents' relationship. Thus, the contents' relationship can be more appropriately defined irrespective of the absolute number of users utilizing each content than when a co-occurrence frequency is used.

Thus, the user can use the network indicating the contents' relationship to accurately grasp the configuration of the contents' set. For example, the user can accurately grasp the configuration of the contents' set containing contents in a strong relationship such as minor genres of contents irrespective of a small absolute number of users.

Even when the contents' set is on a large scale, contents are aggregated, a partial network is extracted and a network indicating a relationship between the contents is created. Thus, the user can use the network (or partial network) to accurately grasp the configuration of the contents' set.

The preferred embodiment of the present invention has been described above with reference to the appended drawings but the present invention is not limited to the example. It should be understood by those skilled in the art that various modifications and alterations may be made without departing from the technical spirit described in the appended claims and may fall within the technical scope of the present invention.

The present application contains subject matter related to that disclosed in Japanese Priority Patent Application JP 2009-237472 filed in the Japan Patent Office on Oct. 14, 2009, the entire content of which is hereby incorporated by reference.

What is claimed is:

1. A contents' relationship visualizing apparatus comprising:
   at least one memory storing instructions; and
   at least one processor programmed via the instructions to:
   acquire a usage history comprising, for each one of a plurality of items of content, a user set comprising a plurality of elements each corresponding to a user who has utilized the one item of content;
   compare the plurality of elements in each user set to identify a set of elements common to each user set;
   calculate a similarity between the user sets by comparing the elements common to each user set to at least one of a total number of elements in at least one user set, a minimum number of elements contained in each user set, and a distance between the user sets;
   generate information representing a network, the network indicating one or more relationships between the plurality of items of content along a time-line comprising a plurality of usage time periods, the one or more relationships being based at least in part on the calculated similarity between the user sets.

2. The contents' relationship visualizing apparatus according to claim 1, wherein the at least one processor is programmed to extract a partial network meeting a predetermined reference from the network.

3. The contents' relationship visualizing apparatus according to claim 2, wherein the at least one processor is programmed to extract the partial network made of contents whose similarity between users' sets meets the predetermined reference from the network.

4. The contents' relationship visualizing apparatus according to claim 2, wherein the at least one processor is programmed to extract the partial network made of contents belonging to a cluster meeting the predetermined reference from the network.

5. The contents' relationship visualizing apparatus according to claim 2, wherein the at least one processor is programmed to extract the partial network made of contents having a characteristic meeting the predetermined reference from the network.

6. The contents' relationship visualizing apparatus according to claim 1, wherein the at least one processor is programmed to aggregate multiple contents meeting a predetermined reference into one content and aggregating usage histories of the multiple contents into one usage history.

7. The contents' relationship visualizing apparatus according to claim 1, wherein the usage history for each one of the plurality of items of content possesses attributes corresponding to the one item's user set.

8. The contents' relationship visualizing apparatus according to claim 1, wherein the generated information is usable by a device to display the network indicating an item of content using a node and indicating a relationship between items of content using a link connecting the nodes.

9. The contents' relationship visualizing apparatus according to claim 1, wherein the plurality of usage time periods are mutually exclusive.

10. The contents' relationship visualizing apparatus according to claim 1, wherein the at least one processor is programmed to calculate a similarity between the user sets by comparing the elements common to each set to a total number of elements in at least one set to calculate a Jaccard coefficient, by comparing the elements common to each set to a minimum number of elements contained in each set to calculate a Simpson's coefficient, and/or by comparing the elements common to each set to a distance between the sets to calculate a cosine similarity.

11. The contents' relationship visualizing apparatus according to claim 1, wherein the at least one processor is programmed to calculate a similarity between the user sets using any one similarity index among Pearson's product-moment correlation coefficient, Euclidean distance, Mahalanobis distance and kernel function.

12. A contents' relationship visualizing method, the method comprising:
   determining, using at least one processor, a usage history comprising, for each one of a plurality of items of content, a user set comprising a plurality of elements each corresponding to a user who has utilized the one item of content;
   comparing, using the at least one processor, the plurality of elements in each user set to identify a set of elements common to each user set;
   calculating, using the at least one processor, a similarity between the user sets by comparing the elements common to each user set to at least one of a total number of elements in at least one user set, a minimum number of elements contained in each user set, and a distance between the user sets; and
   generating, using the at least processor, information representing a network, the network indicating one or more relationships between the plurality of items of content along a time-line comprising a plurality of usage time periods, the one or more relationships being based at least in part on the calculated similarity between the user sets; and providing the generated information to a device configured to visually display the network.

13. At least one non-transitory computer-readable medium having encoded thereon instructions which, when executed, cause a computer to perform a contents' relationship visualizing method, the method comprising:
   acquiring a usage history comprising, for each one of a plurality of items of content, a user set comprising a plurality of elements each corresponding to a user who has utilized the one item of content;
   comparing the plurality of elements in each user set to identify a set of elements common to each user set;
   calculating a similarity between the user sets by comparing the elements common to each user set to at least one of a total number of elements in at least one user set, a minimum number of elements contained in each user set, and a distance between the user sets; and
   generating information representing a network, the network indicating one or more relationships between the plurality of items of content along a time-line comprising a plurality of usage time periods, the one or more relationships being based at least in part on the calculated similarity between the user sets.

* * * * *